US010150411B2

(12) United States Patent
Armitage et al.

(10) Patent No.: US 10,150,411 B2
(45) Date of Patent: Dec. 11, 2018

(54) MONITORING AND NOTIFICATION OF ABERRATIONAL DRIVER BASED ON TIME-SEPARATED EVENTS

(71) Applicant: Cartasite, Inc., Denver, CO (US)

(72) Inventors: David L. Armitage, Golden, CO (US); Gregory F. Kushnir, Denver, CO (US)

(73) Assignee: CARTASITE, INC., Denver, CO (US)

( * ) Notice: Subject to any disclaimer, the term of this patent is extended or adjusted under 35 U.S.C. 154(b) by 0 days.

(21) Appl. No.: 15/488,229

(22) Filed: Apr. 14, 2017

(65) Prior Publication Data

US 2018/0297518 A1 Oct. 18, 2018

(51) Int. Cl.

| | |
|---|---|
| ***G08B 21/00*** | (2006.01) |
| ***B60Q 9/00*** | (2006.01) |
| ***G08B 21/02*** | (2006.01) |
| ***G07C 5/02*** | (2006.01) |

(52) U.S. Cl.

CPC ................. *B60Q 9/00* (2013.01); *G07C 5/02* (2013.01); *G08B 21/02* (2013.01)

(58) Field of Classification Search

CPC .................................. G07C 5/02; G08B 21/02

USPC .......................................................... 340/576

See application file for complete search history.

(56) References Cited

U.S. PATENT DOCUMENTS

| | | | | |
|---|---|---|---|---|
| 8,466,781 | B2 * | 6/2013 | Miller | G06F 17/00 340/439 |
| 8,604,920 | B2 | 12/2013 | Armitage et al. | |
| 9,082,308 | B2 | 7/2015 | Armitage et al. | |
| 9,315,195 | B2 | 4/2016 | Armitage et al. | |
| 2008/0243350 | A1 * | 10/2008 | Harkness | B60Q 9/00 701/93 |
| 2010/0045452 | A1 * | 2/2010 | Periwal | B60Q 9/00 340/439 |
| 2011/0254655 | A1 * | 10/2011 | Maalouf | G06Q 30/02 340/3.1 |
| 2013/0179027 | A1 | 7/2013 | Mitchell | |
| 2014/0167946 | A1 | 6/2014 | Armitage et al. | |
| 2014/0199662 | A1 * | 7/2014 | Armitage | B60W 40/09 434/65 |
| 2014/0306826 | A1 * | 10/2014 | Ricci | H04W 4/21 340/573.1 |
| 2015/0019067 | A1 | 1/2015 | Chakravarty et al. | |
| 2015/0258892 | A1 * | 9/2015 | Wu | B60K 28/06 340/576 |

* cited by examiner

*Primary Examiner* — Mark Rushing

(74) *Attorney, Agent, or Firm* — Lewis Brisbois Bisgaard & Smith LLP; Thomas A. Dougherty

(57) ABSTRACT

Systems and methods for remotely monitoring a driver's behavior, in essentially real time, and providing a notification to the driver when at least two aberrational driver events, which deviate from previously-observed driver actions and/or regulatory limits, are detected. The systems can include a discrepancy calculation module configured to analyze data received from sensors and compare the data to previously-observed driver actions and/or regulatory limits.

20 Claims, 8 Drawing Sheets

MONITORING AND NOTIFICATION OF ABERRATIONAL DRIVER BASED ON TIME-SEPARATED EVENTS

BACKGROUND

Driver behavior, which has a huge impact on the potential for vehicle accidents and other accidents due to driver behavior, has long been a concern. In addition to increasing the risks of a potential accident, driver behavior may have other important cost and environmental impacts as well. For example, rapid or frequent acceleration of a vehicle may result in less efficient fuel consumption or higher concentrations of pollutants. In addition, hard braking or excessive speed may result in increased maintenance costs, unexpected repair costs, or require premature vehicle replacement.

Various driver performance monitoring systems can be used to assess a driver's operation of a vehicle, such as an automobile, or the like. These performance monitoring systems analyze the movement of the vehicle, movement such as speed, braking, acceleration, and swerving, as measured by various sensors on-board the vehicle. The performance monitoring systems may assess the behavior of the driver operating the vehicle and gather data information pertaining to how that person is operating the vehicle. These assessments can be done in both real time and non-real time manners.

SUMMARY

Generally, the present disclosure provides systems and methods for remotely monitoring a driver's behavior, in essentially real time, and providing a notification to the driver when the behavior deviates from previously-observed driver actions and/or regulatory limits. If the systems detect at least two aberrational driver events within a time window for the driver, the notification is sent.

One particular implementation described herein is a method that includes receiving sensor data from a plurality of sensors within a vehicle, analyzing that sensor data to detect at least two aberrational driver events, and, responsive to the detection of the at least two aberrational driver events, generating a notification to alert that individual driver of the vehicle. The aberrational driver events are determined from observed driver actions for that individual driver within a time window, the aberrational driver events time-separated and occurring when the observed driver actions for the individual driver satisfy anomaly criteria.

Another particular implementation described herein is a method that includes receiving sensor data regarding observed driver action from a plurality of sensors within a vehicle, comparing that sensor data to anomaly criteria to identify at least two aberrational driver events, and, responsive to the detection of at least two, time-separated aberrational driver events, generating a notification to alert that individual driver of the vehicle.

Yet another particular implementation described herein is a system for remotely monitoring behavior of a driver. The system includes a discrepancy calculation module stored in memory and executable by a processor, and a notification module stored in memory and executable by the processor. The discrepancy calculation module is configured to receive sensor data for an individual driver and to analyze the sensor data to detect at least two aberrational driver events from the data within a time window, the aberrational driver events time-separated and occurring when the data satisfy anomaly criteria. The notification module is configured to notify the driver upon detection of the at least two aberrational driver events.

The disclosure also generally provides one or more computer-readable storage media of a tangible article of manufacture encoding computer-executable instructions for executing on a computer system a computer process. The computer process includes receiving sensor data for an individual driver; analyzing the sensor data to detect at least two aberrational driver events from the data within a time window, the aberrational driver events time-separated and occurring when the data satisfy anomaly criteria; and notifying the driver upon detection of the at least two aberrational driver events.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following detailed description.

BRIEF DESCRIPTIONS OF THE DRAWINGS

The described technology is best understood from the following Detailed Description describing various implementations read in connection with the accompanying drawings.

DETAILED DESCRIPTION

Figure 1:
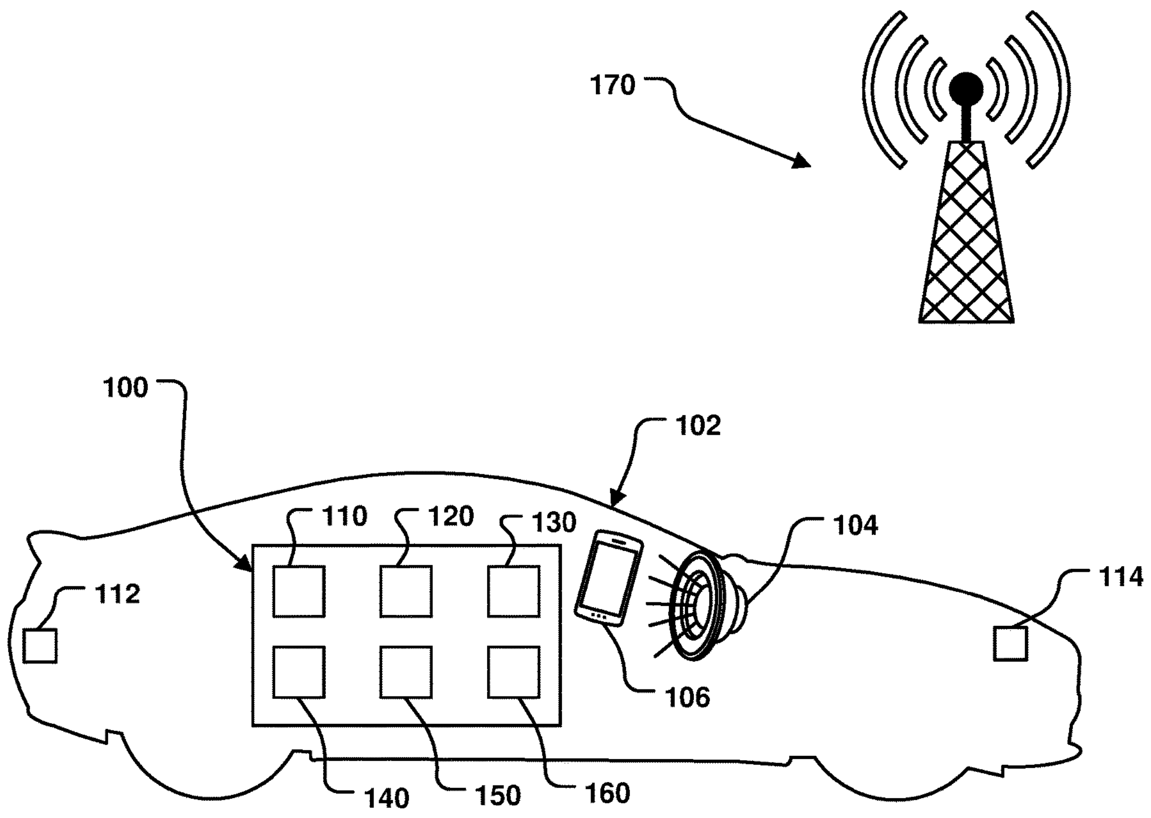
FIG. 1 is a schematic diagram of an example driving monitoring and coaching system located in a vehicle.

Provided herein are various systems, modules and methods for remotely monitoring a driver. In general, a driver's actions are monitored by various sensors located in or on the vehicle being driven, and data from those sensors is analyzed to detect if and when the driver performs actions that deviate from predetermined norms. A method described herein includes sending a notification to the driver responsive to detection of at least two driver events that satisfy anomaly criteria defining behavior that is "aberrational" as compared to pre-determined driving norms. In some implementations, the pre-determined driving norms are driver-specific (e.g., based on the driver's own previous driving patterns or behavior). In other implementations, the pre-determined driving norms may be adjusted to take into account the current driving environment and conditions.

In one implementation, anomaly criteria are driver-specific and are, for a particular driver, based on that driver's own driving habits and tendencies, rather than a generic or hypothetical person's driving habits and tendencies. In another implementation, current driving environment is also used to set the anomaly criteria to determine whether the driver's driving habits are aberrational. For example, if the current flow of traffic on the road being driven is, e.g., 10 mph over the posted regulatory limit, the anomaly criteria will be adjusted accordingly, so that a speeding notification is not sent, due to the driver merely 'keeping up with traffic' or 'going with the flow.'

Unlike other monitoring and notification systems, the systems described here are configured to send a notification after two or more of these aberrational driver events have been detected. Sending the notification after two or more of these aberrational driver events have been detected allows leeway for a driving action that is not typical for that driver, but a rare occurrence, such as, e.g., accelerating to get around another vehicle, sharply swerving to avoid a collision with a deer, sharply braking to avoid a ball misplayed into the road, and sliding around a sharp corner in icy conditions. The systems and methods described here do not discipline a driver for a single occurrence of a bad driving event, but advise the driver when the bad driving events are more frequent, e.g., constitute a pattern.

Any notification that is sent, when at least two or more aberrational driver events have been detected, can be a non-accusatory, non-confrontational message, e.g., stating the detected aberrational event as a mere observance, rather than accusing the driver or bad behavior. It is human nature for a driver to become obstinate when confronted, particularly over a single event that may have been unavoidable. The systems and methods described herein are technical improvements over known monitoring systems because the systems and methods take into account human tendencies and human nature, while also accounting for the occasional abnormal driving event, which allows for a more accurate determination of a trend of abnormal driving behavior (e.g., road rage). The systems and methods take into account the normal tendencies of that driver for the situation, allowing for the occasional deviation from normal.

Included in this disclosure are implementations of various methods, systems, modules, computer processes, computer-executable instructions, and computer-readable storage media encoding computer-executable instructions for executing the methods and/or processes.

In the following description, reference is made to the accompanying drawing that forms a part hereof and in which are shown by way of illustration at least one specific implementation. The following description provides additional specific implementations. It is to be understood that other implementations are contemplated and may be made without departing from the scope or spirit of the present disclosure. The following detailed description, therefore, is not to be taken in a limiting sense. While the present disclosure is not so limited, an appreciation of various aspects of the disclosure will be gained through a discussion of the examples provided below.

FIG. 1 illustrates an example driving monitoring and notification system 100 within a vehicle 102. The monitoring and notification system 100 may be physically present in the vehicle 102 as a physical device removably positioned within the vehicle 102, thus allowing the system 100 to be removed from the vehicle 102, alternately, all or part of the monitoring and notification system 100 may be fixed (e.g., permanently fixed) within or integral with the vehicle 102. Additionally, part of the driving monitoring and notification system 100 may be at a location remote to the vehicle; for example, part of the system 100 may be located within the vehicle 102 and another part of the system 100 may be at a remote location.

The vehicle 102 is equipped with a sound-emitting speaker 104, which may be installed in the vehicle 102, either as a factory-installed feature or an after-market feature. In the illustrated implementation, also present within the vehicle 102 is a cellular phone 106. In some implementations, the speaker 104 may be part of the phone 106.

The driving monitoring system 100 includes a plurality of sensors 110, an aberration detector module 120, a notification module 130, a processor 140, memory 150, and a communication system 160.

The plurality of sensors 110 monitor the movement and motion of the vehicle 102. Examples of suitable sensors 110 include any one or more of an accelerometer, a gyroscope, a gravimeter, a pressure sensor, and/or a temperature sensor. With these sensors 110, driving events or actions such as acceleration, speeding, braking or deceleration, erratic braking, swerving or lateral acceleration or G-force, are sensed. In some implementations, a Global Positioning System (GPS), Global Navigation Satellite System (GLONASS), or other location or positioning sensor may be one of the sensors 110.

The sensors 110 may be part of (e.g., in or on) a physical device that is the driving monitoring system 100, or one or more of the sensors 110 may be located in or on the vehicle 102. For example, FIG. 1 illustrates two sensors 112, 114 that are incorporated into the vehicle 102, e.g., present in the structure of the vehicle 102.

The aberration detector module 120 collects and analyzes sensor data from the sensors 110 to identify a sequence of observed driver actions for a driving activity. An observed driver action may be identified based on data from a single sensor or a plurality of sensors 110. Different driving activities may be classified as different "types" of activities, including without limitation speeding, acceleration (e.g., rapid acceleration), deceleration (e.g., rapid deceleration) or hard braking, erratic braking, and swearing or lateral acceleration. Once a series of observed driver actions are identified, the aberration detector module 120 compares the observed driver actions to anomaly criteria to determine whether any of the observed driver actions are "aberrational" with respect to pre-determined driving norms and/or limits. p Anomaly criteria may be derived differently in different implementations. The anomaly criteria can be based on guidelines (e.g., regulatory limits) or predefined behavioral norms. Additionally or alternately, anomaly criteria can be established based on historical behavior (e.g., from the previous week, previous day) of a driver. Still further, anomaly criteria can be based on historical behavior for the same driver that the anomaly criteria is used to evaluate. For example, the aberration detector module 120 may compare real-time observed driver actions with other actions of the same driver observed 10 minutes prior. In some implementations, anomaly criteria is route-specific. For example, a route along an interstate will have a wider range of speeds than a route through a suburban neighborhood.

Additional details regarding the methodology for comparing the data from the sensors 110 and observed driver actions to anomaly criteria to determine an aberrational event are discussed in respect to FIG. 3, below.

Returning to FIG. 1, the driving monitoring system 100 also includes the notification module 130 to notify the driver when an aberrational driver event has been detected by the aberration detector module 120. Although other implementations are contemplated, the particular driving monitoring system 100 notifies the driver responsive to detection of two or more aberrational events in a set time period or time window. In particular, the notification module 130 is configured to alert the driver of the vehicle 102 that two aberrational driver events have been detected by the aberration detector module 120. In some implementations, the notification module 130 is configured to alert responsive to detection of three or more aberrational driver events.

The notification module 130 may deliver the notification, for example, through the speaker 104 in the vehicle 102, or through a speaker in the cell phone 106. In other implementations, the notification module 130 may send a notification to the cell phone 106 as a text message.

In some implementations, the notification is a non-confrontational message, e.g., stating the detected aberrational events as a mere observance, or posing a question rather than accusing the driver. The notification may or may directly address the observed detected aberrational events. In some implementations, the notification requests a response or acknowledgement from the driver. Examples of possible notifications include: "We noticed that you have changed lanes without signaling and your speed has dropped well below the speed limit. Are you feeling tired or distracted?" and "The temperature has dropped below freezing and you are driving faster than usual. You might want to slow down a bit." Not tied to any detected aberrational events, the driver may receive a congratulatory notification when no aberrational driver events are detected, or when the driving monitoring system 100 detects that the driving has improved.

Concurrently or subsequently, a notification may be sent to a device remote from the vehicle 102 to inform a third party that a sequence (e.g., at least two) aberrational driver events have been detected. For example, if the vehicle 102 is a fleet vehicle, the owner or manager of the fleet may receive a notification that aberrational driver events were detected. Such a remote notification may be sent to a cell phone, a tablet, a computer, etc. as an audible notification or as a visual notification, e.g., a textual message, a light, an audible tone, or any combination thereof.

The driving monitoring system 100 also includes an appropriate processor 140 and memory 150 storing one or more applications executable by the processor, such as, the aberration detector module 120 and the notification module 130. The processor 140 executes the aberration detector module 120 to perform various operations, e.g., initiating sensor data collection, initiating location determination (if a GPS or other location sensor is present), measuring time for the time period or window, comparing collected data to predetermined observed driver actions, detecting aberrational driver events, etc. Information such as predetermined observed driver actions, detected aberrational driver events, as well as any instructional modules, are stored in memory 150.

The device 100 also includes a communication system 160 to transmit any indication of detected aberrational driver events to the notification module 130 and/or any speaker, e.g., the speaker 104; this transmission may be across a network 170. In some implementations, the communication system 160 transmits from the notification module 130 to the speaker 104 when two aberrational driver events have been detected within the prescribed time period or window.

The communication system 160 can include a short-range communication system for communicating across a local area network (LAN) (e.g., a Wi-Fi, a Bluetooth™ network, BLE (Bluetooth Low Energy) network) from the notification module 130 to a device such as the vehicle speaker 104 or the driver's cellphone 106, which then provides a notification to the driver. Additionally or alternately, the communication system 160 can include a long-range communication system for communicating across a wide-area network (WAN) (e.g., via a radio frequency (RF), cellular-based, or satellite-based system), that can be used to transmit from the notification module 130 via the network 170 to a remote location, such as a fleet manager, via a, e.g., long range network.

Figure 2:
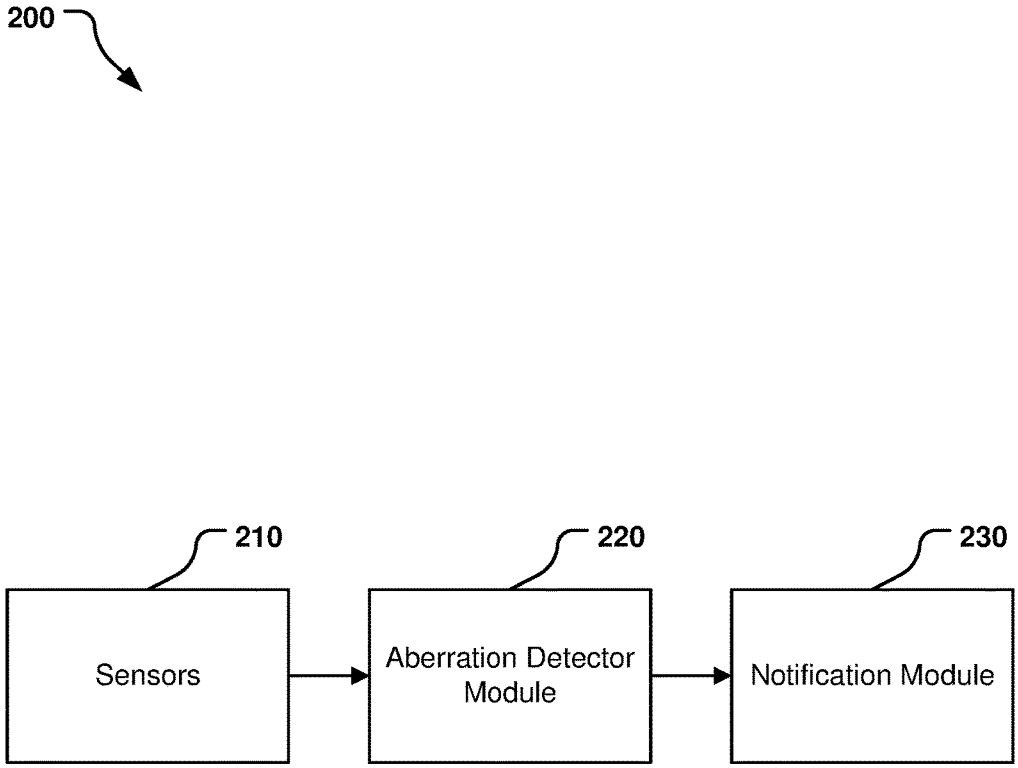
FIG. 2 is a schematic diagram of an example driving monitoring and coaching system.

A system for monitoring driver or driving performance and issuing a notification responsive to the performance is generically shown in FIG. 2 as a remote monitoring system 200. The basics of driver monitoring system 200 are sensors 210, which provide data to an aberration detector module 220, which analyzes the data and detects any aberrational driver events, and a notification module 230, which provides a notification when two or more aberrational driver events have been detected by the aberration detector module 220. FIG. 3 describes an example implementation of how aberrational driver events are detected.

Figure 3:
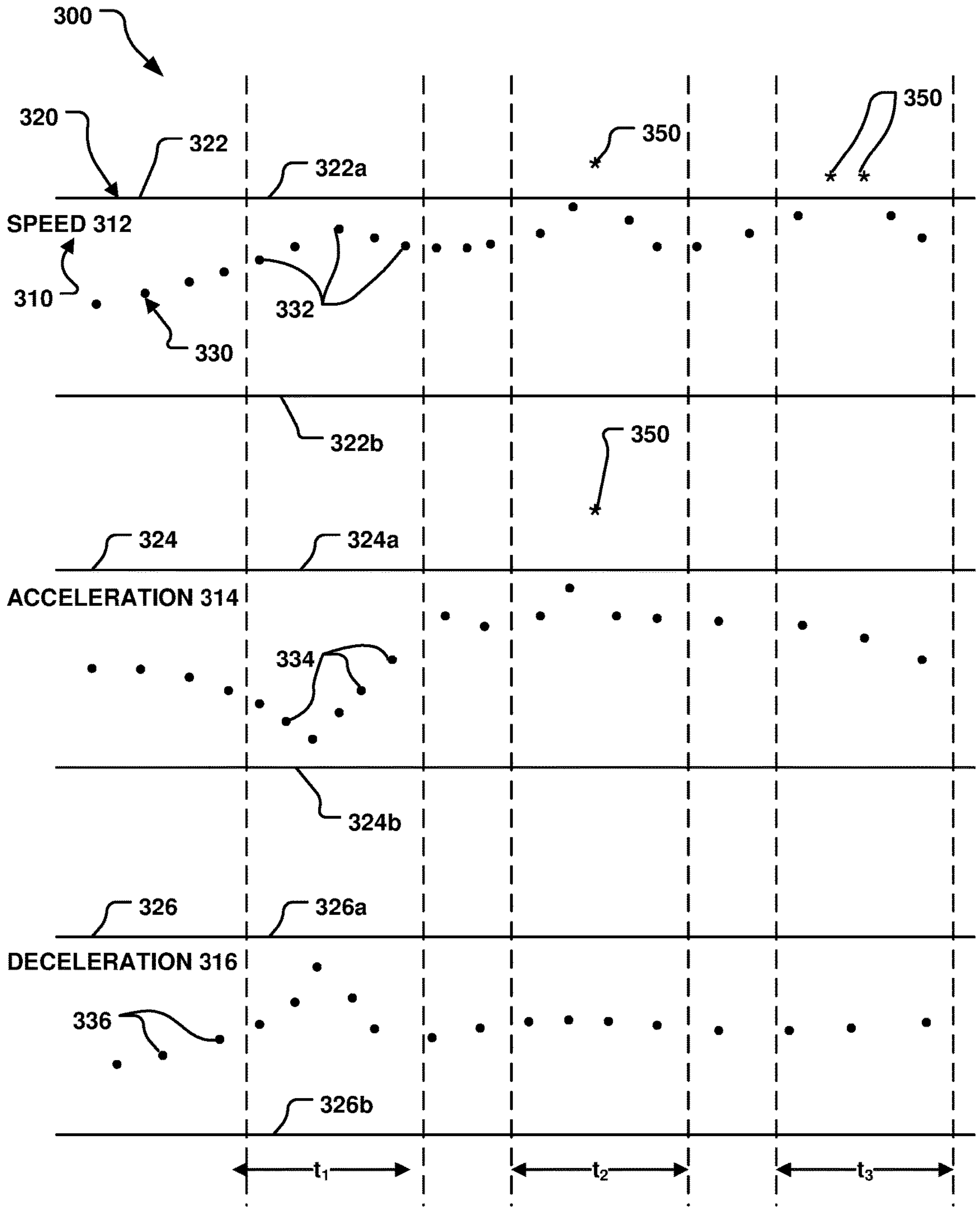
FIG. 3 is a graphical diagram of example data point collection and analysis by a driving monitoring and notification system.

FIG. 3 illustrates an example methodology 300 for determining aberrational driver events from sensor data obtained for at least one driving activity.

The methodology 300 includes comparing anomaly criteria 320 for a particular driving activity 310 to observed driver actions 330 for that driving activity 310. The anomaly criteria 320, which determines an aberrational driver event for that driving activity 310, can be based on predetermined limits or based on observed driving behavior for the associated type of driver activity within a time interval. The observed driver actions (e.g., the driver actions 330) are shown in FIG. 3 as individual data points, although in other implementations the monitoring may be continuous, so that rather than data points, a continuous stream of data is obtained. If an observed driver action 330 satisfies the anomaly criteria 320, that is, exceeds either above or below the anomaly criteria, that observed driver action 330 is flagged as an aberrational driver event.

FIG. 3 shows three example or types of driving activities 310, particularly, "speed" 312, "acceleration" 314, and "deceleration" 316. Each of these driving activities 310 is monitored or sampled by at least one of the sensors (e.g., sensors 110 of FIG. 1) and the observed driver actions 330 are obtained. For example, speed 312 can be monitored by a location or position sensor, acceleration 314 can be monitored by an accelerometer, and deceleration 316 can be monitored by an accelerometer or a gravimeter; other driver actions can be monitored by other sensors; for example, swerving or lateral acceleration can be monitored by a gyroscope.

Each driving activity 310 has associated anomaly criteria 320 defining an acceptable associated upper criteria limit and a lower criteria limit for that driving activity 310; particularly, speed 312 has an anomaly criteria 322 having an upper criteria limit 322*a* and a lower criteria limit 322*b*, acceleration 314 has an anomaly criteria 324 having an upper criteria limit 324*a* and a lower criteria limit 324*b*, and deceleration 316 has an anomaly criteria 326 having an upper criteria limit 326*a* and a lower criteria limit 326*b*. The anomaly criteria 320, and the upper and lower criteria limits, may be one or a combination of a regulatory limit, a predetermined limit or threshold, or based on previously observed driver actions or a behavior pattern or trend.

The anomaly criteria 320 and the upper and lower criteria limits for any driving activity (e.g., anomaly criteria 322, including limits 322*a* and 322*b*, for speed 312) may be based on an observed behavior pattern or observed trend of previous behavior. For example, the anomaly criteria 320 may be based on a trend observed by analyzing historical data or information, e.g., from the previous day, from the previous week, the previous time the particular route was driven, etc. The historical data or information may be from that particular driver being monitored or from a fleet of drivers. Additionally or alternately, the anomaly criteria 320 may be based on a more recently observed trend, such as the particular driver's own driving behavior during that trip, for example, in the previous 15 minutes. The observed pattern or trend may be dynamic, shifting over time; for example, the anomaly criteria 320 may be based on the observed driver action 330 ten (10) minutes prior to the current observed driver action 330. For example, the upper criteria limit 322*a* for speed 312 can be a combination of a posted speed limit for the road that is being traveled and the previously observed driver actions for that route, by that driver, on the previous day.

Any anomaly criteria 320, e.g., the upper criteria limit and/or the lower criteria limit, can further be based considering the current driving environment or conditions, e.g., expected speeds for interstate rush hour, expected or known traffic congestion, bad weather or other environmental conditions, road condition, etc. As another example, the upper criteria limit 322*a* for speed 312 can be a combination of a posted speed limit for the road that is being traveled, the previously observed driver actions for that route, by that driver, on the previous day, adjusted to take into consideration that it is raining.

Although the anomaly criteria 320 shown in FIG. 3 are level or unchanging, the anomaly criteria 320 may increase, decrease, or otherwise fluctuate over time. Additionally, the range between the upper limit/threshold/range and the lower limit/threshold/range may vary over time.

A method of monitoring driving performance includes analyzing the observed driver actions 330 for at least one driving activity 310 and detecting at least two aberrational driver events, which are observed driver actions 330 outside of the anomaly criteria 320 for that driving activity 310. If the at least two aberrational driver events are observed within a time window, a notification is sent.

Each driving activity 310 has associated observed driver actions 330, which are obtained from sensors (e.g., sensors 110 of FIG. 1) in or on the vehicle; particularly, speed 312 has observed driver actions 332, acceleration 314 has observed driver actions 334, and deceleration 316 has observed driver actions 336. As indicated above, the observed driver actions 330 are shown in FIG. 3 as individual data points from the sensors. The sensors may sample intermittently, either non-randomly or randomly; for example, the sensors may sample, e.g., every 10 seconds, every 15 seconds, every 30 seconds, or, anywhere between, e.g., 1 to 30 seconds. The frequency of sampling can be adjusted, or the system may automatically adjust the sampling frequency, based on current conditions such as traffic congestion, weather or other environment conditions, road conditions, location, etc. For example, the sampling can be less frequent on rural and/or on interstate highways and more frequent in urban and residential areas. Alternately, the sensors may provide continuous monitoring of the driving habits, providing an unbroken stream of continuous observed actions.

The example methodology 300 of FIG. 3 illustrates three sequential time windows, $t_1$, $t_2$ and $t_3$; in this particular example, none of the time windows $t_1$, $t_2$ and $t_3$ overlap, although in other implementations, a portion of one or more windows may overlap a portion of another time window. The time windows $t_1$, $t_2$, $t_3$ may be, e.g., minutes apart, and may be any duration of time, including, e.g., 5 minutes, 10 minutes, 15 minutes, 30 minutes, etc. The time window length can be adjusted, or the system may automatically (e.g., dynamically) adjust the time window length, based on current conditions such as traffic congestion, weather or other environmental conditions, road conditions, location, etc. Additionally, the period between adjacent time windows can be adjusted (e.g., dynamically), and/or the system can automatically adjust the frequency, either or both based on current conditions.

Exemplary observed driver actions 330 are provided in FIG. 3 for each driving activity 310. Specifically, obtained individual observed driver actions 332 for the driver's speed 312 are shown in relation to the anomaly criteria 322. In the illustrated implementation, the individual observed driver actions 332 have an increasing trend in time window $t_1$, yet remain within the anomaly criteria 322 defined by the upper criteria limit 322*a* and the lower criteria limit 322*b*. In time window $t_2$, one individual observed driver action 332 is above the upper criteria limit 322*a* and satisfies the anomaly criteria 322, and hence, this observed driver action 332 is an aberrational driver event 350. In time window $t_3$, two individual observed driver actions 332 are above the upper criteria limit 322*a* of the anomaly criteria 322 and are, hence, aberrational driver events 350. Similarly, the observed driver actions 334 for acceleration 314 are shown in relation to the anomaly criteria 324. In the illustrated implementation, the individual observed driver actions 334 have a drop and recovery within the criteria limits 324*a*, 324*b* of the anomaly criteria 324 in time window $t_1$, are fairly steady in time window $t_3$, and have one individual observed driver action 334 above the upper criteria limit 324*a* in time window $t_2$. This one observed driver action 334 above the upper criteria limit 324*a* in time window $t_2$ satisfies the anomaly criteria 324 and is, hence, is an aberrational driver event 350. Similarly, the observed driver actions 336 for deceleration 316 are shown in relation to the anomaly criteria 326. For deceleration 316, the observed driver actions 336 are fairly steady within the criteria limits 326*a*, 326*b* of the anomaly criteria 326 in all of time window $t_1$, time window $t_2$, and in time window $t_3$, with one observed driver action 336 increased in time window $t_1$ but still within the bounds of the anomaly criteria 326. Thus, no aberrational driver events are noted for deceleration 316.

In the example provided in FIG. 3, three types of driving activities 310 have anomaly criteria 320 associated therewith and all three are being monitored for any aberrational driver events. In other implementations, not all the driving activities 310 are monitored simultaneously; the driving activities 310 being monitored may vary depending on the environmental conditions, e.g., road conditions, traffic congestion, weather, etc.

A notification is sent to the driver when two aberrational driver events 350, time-separated from each other within a time window, satisfy anomaly criteria, or in other words, are outside of (either above or below) a criteria limit. In order to trigger a notification, the two aberrational driver events 350 are not simultaneous, but one is subsequent to the other, for example, by 10 seconds, 1 minute, etc., being either sequential data samplings or non-sequential. In some implementations, the notification is sent when the two aberrational driver events 350 are in the same driving activities 310 (e.g., both in speed 312, both in acceleration 314, etc.) in the same time window, whereas in other implementations, the notification is sent when the two aberrational driver events 350 are in different driving activities 310 (e.g., one in speed 312 and one acceleration 314, etc.) non-coincidental but separated by time in the same time window.

Figure 4:
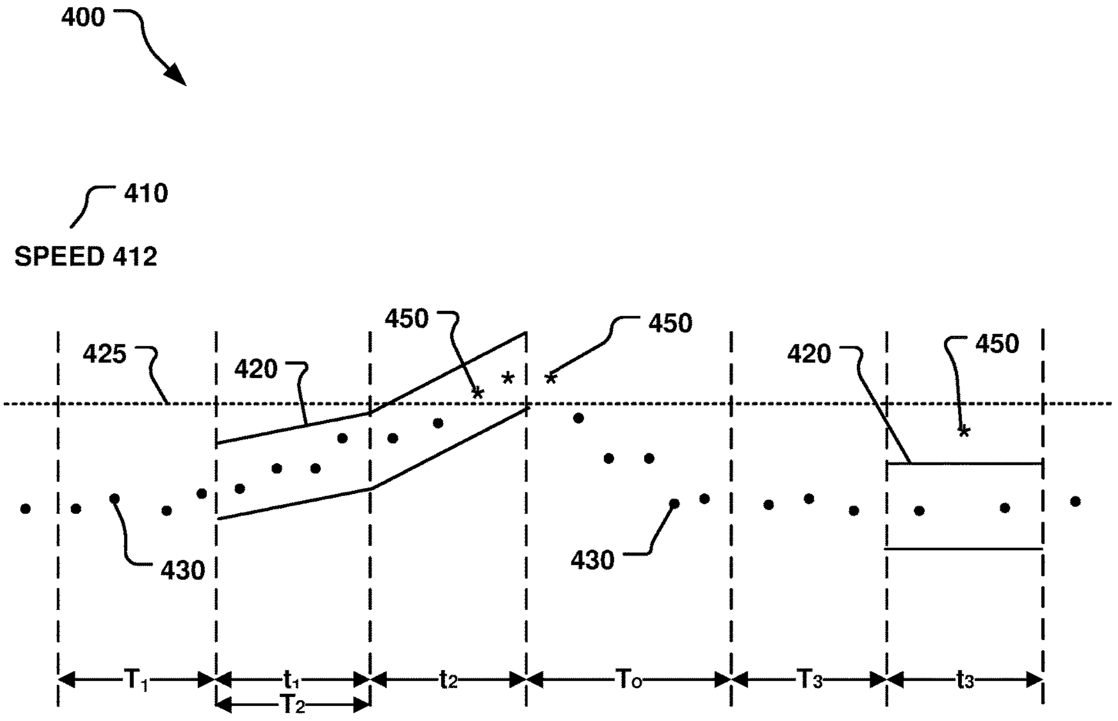
FIG. 4 is a graphical diagram of another example data point collection and analysis by a driving monitoring and notification system.

FIG. 4 illustrates another example methodology 400 for determining aberrational driver events based on at least one type of driving activity 410.

The methodology 400 includes comparing a first anomaly criteria 420 and a second anomaly criteria 425 to observed driver actions 430 for a particular type of driving activity 410. The anomaly criteria 420, 425, which are used to determine an aberrational driver event for the driving activity 410, in this example, is based on both previously observed driving behavior for the associated type of driving activity within an immediately preceding time interval (first anomaly criteria 420) and on a regulatory limit (second anomaly criteria 425). The observed driver actions 430 are shown in FIG. 4 as individual data points, although in other implementations the monitoring may be continuous, so that rather than data points, a continuous stream of data is obtained. If an observed driver action 430 is sufficiently above or below the limits of either of the anomaly criteria 420, 425, the observed driver action 430 is flagged as an aberrational driver event.

FIG. 4 shows only one example or type of driving activity 410, particularly, "speed" 412, although this same methodology could apply to any and all types of driving activities. The speed 412 is monitored by at least one of the sensors (e.g., sensors 110 of FIG. 1) and the observed driver actions 430 are obtained. In this example, the first anomaly criteria 420 is defined by an upper criteria limit and a lower criteria limit, each determined based on that driver's behavior as previously observed in that route, e.g., in the previous 5 or 10 minutes. Thus, this anomaly criteria 420 is dynamic, shifting over time. Further, in this example, the anomaly criteria 420 is not continuous, as described further below. The second anomaly criteria 425, in this implementation, has only an upper limit, which is the posted speed limit for the road being traveled.

Three sequential time windows, $t_1$, $t_2$ and $t_3$ are illustrated in FIG. 4. The time windows $t_1$, $t_2$, $t_3$ may be any duration of time, e.g., 5 minutes, 10 minutes, 15 minutes, 30 minutes, etc. and may be constant throughout the methodology 400 or the duration may adjust (e.g., dynamically). In some implementations, one or more time windows may overlap an adjacent time window; similarly, any overlap may be constant or may be adjusted (e.g., dynamically), e.g., based on current conditions.

In this particular example, each time window $t_1$, $t_2$, $t_3$ is 10 minutes, with time window $t_2$ immediately following time window $t_1$ and time window $t_3$ delayed from time window $t_2$. The limits for the first criteria 420 for each time window $t_1$, $t_2$, and $t_3$ are based on the observed driver actions, for this particular example, in the previous 10 minutes. Thus, the limits for the anomaly criteria 420 for time window $t_1$ are based on time window $T_1$, the limits for the anomaly criteria 420 for time window $t_2$ are based on time window $T_2$, and the limits for the anomaly criteria 420 for time window $t_3$ are based on time window $T_3$ In this example, time window $T_2$ overlaps with time window $t_1$. The limit for the second anomaly criteria 425 is continuous and constant, at the posted speed limit.

As with methodology 300 in FIG. 3, the observed driver actions 430 are obtained from sensor(s) that may sample intermittently, either non-randomly or randomly, or continuously. The frequency of sampling can be adjusted, or the system may automatically adjust the sampling frequency, based on current conditions such as traffic congestion, weather or other environment conditions, road conditions, location, etc. For example, the sampling can be less frequent on rural routes and on interstate highways and more frequent in urban and residential areas. Alternately, the sensors may provide continuous monitoring of the driving habits, providing an unbroken stream of continuous observed actions.

Obtained individual observed driver actions 430 for the driver's speed 412 are shown in relation to the anomaly criteria 420 and 425. In the illustrated implementation, after the driver starts driving, time window $T_1$ begins, tracking the observed driver actions 430 to establish a driver pattern and the anomaly criteria 420 for time window $t_1$. In time window $T_1$, the observed driver actions 430 have a slightly increasing trend, thus providing a slightly increasing anomaly criteria 420 for time window $t_1$. As additional observed driver actions 430 are collected and analyzed in time window $t_1$, those same observed driver actions 430 are used to establish the anomaly criteria 420 for time window $t_2$. In time window $T_2$ (which is also time window $t_1$), the observed driver actions 430 have an even more increasing trend, thus further increasing the anomaly criteria 420 for time window $t_2$.

In time window $t_1$, the observed driver actions 430 are within the bounds of the anomaly criteria 420 and the anomaly criteria 425. In time window $t_2$, the individual observed driver actions 430 have an increasing trend yet remain within the anomaly criteria 420, due to anomaly criteria 420 increasing because of the increasing observed driver actions 430 in time window $T_2$. However, two individual observed driver actions 430 are above the regulatory speed limit criteria 425, thus qualifying as aberrational driver events 450. It is seen that a third aberrational driver event 450 is detected after time window $t_2$. Upon detection of the two aberrational driver events 450 in time window $t_2$, the driver of the vehicle is notified of the speeding infraction; this notification may occur immediately after the second aberrational driver event 450 is detected, or there may be a delay.

In this example methodology 400, there is no anomaly criteria 420 in place after detection of the two aberrational driver events 450 and after the notification, to allow the driver to adjust the driving style and resume acceptable driving habits. The delay $T_0$ in having the anomaly criteria 420 may be a set period (e.g., 3 minutes, 5 minutes) or may be based on the individual observed driver actions 430 returning to a steady-state.

After the delay $T_0$, time window $T_3$ begins, tracking the observed driver actions 430 to establish a driver pattern and the anomaly criteria 420 for time window $t_3$. In time window $T_3$, the observed driver actions 430 are fairly level, resulting in a level anomaly criteria 420 for time window $t_1$. In time window $t_3$, one aberrational driver event 450 is detected above the anomaly criteria 420. Because this is a single detected aberrational driver event in that time window $t_3$, no notification is sent.

Figure 5:
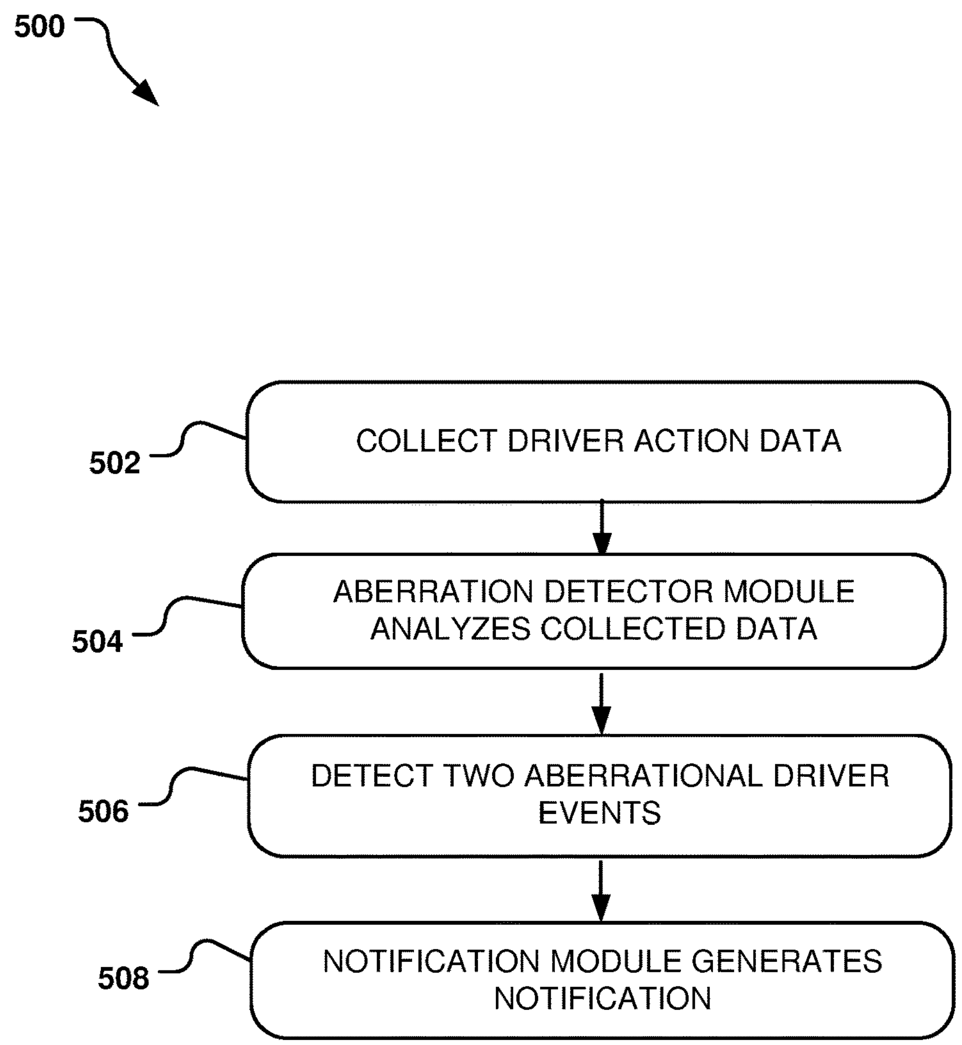
FIG. 5 is a step-wise flow chart of an example driving monitoring and notification method.

FIG. 5 is a flow diagram of methodology 500 for monitoring driving and sending a notification. In operation 502, sensors collect driving data, which represent observed driver actions. In operation 504, an aberration detector module analyzes the sensor data against anomaly criteria. In operation 506, the aberration detector module detects at least two time-separated aberrational driver events. In operation 508, responsive to two aberrational driver events being detected, a notification module generates a notification. It is noted that operation 504 and operation 506 are not necessarily sequential, but may overlap timewise all or a portion thereof. Operations 504 and 506 includes various sub-operations, shown in FIG. 6.

Figure 6:
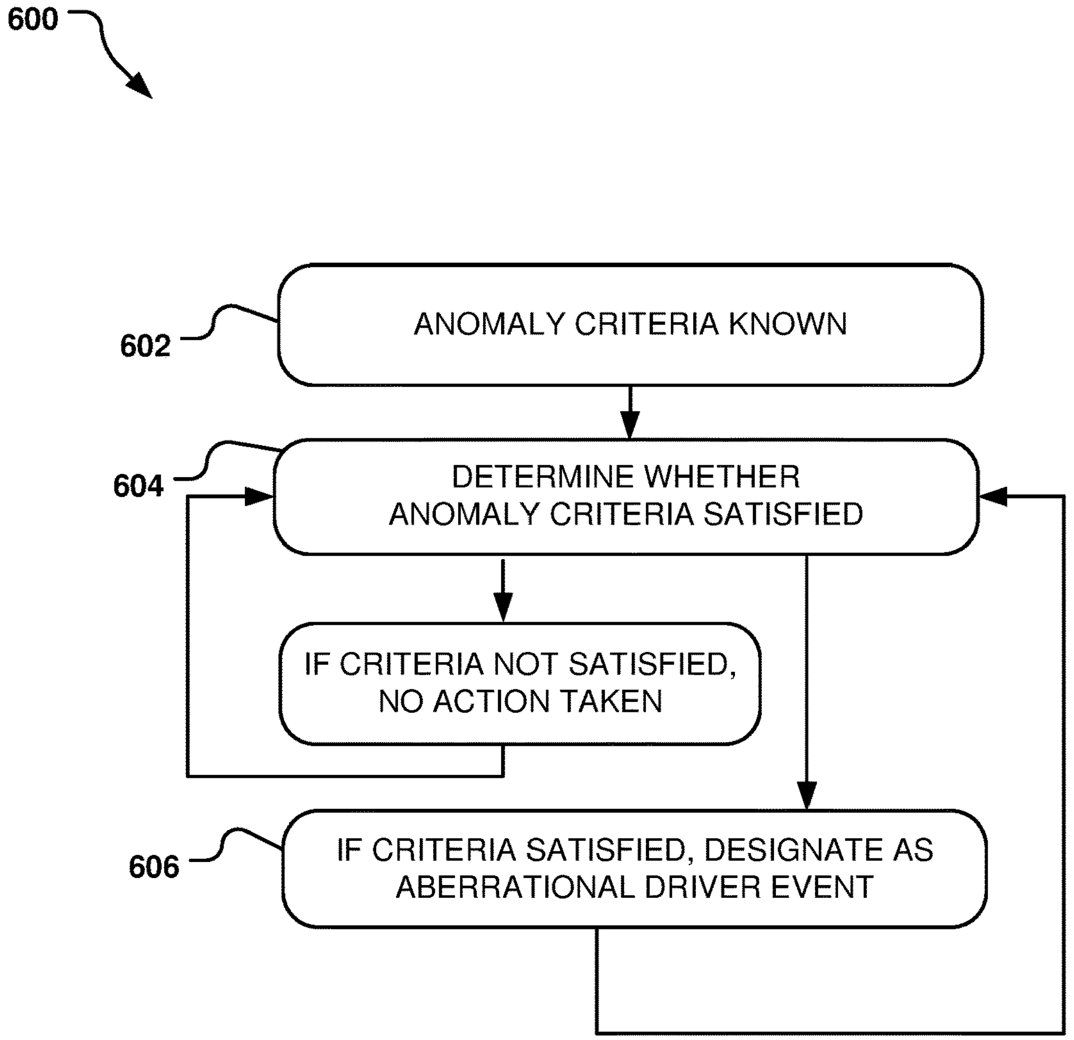
FIG. 6 is a step-wise flow chart of an example aberrational driver event detection method.

FIG. 6 is a flow diagram of methodology 600 to determine whether or not the aberration detector module has detected an aberrational driver event from the sensor data. In operation 602, anomaly criteria for an action (e.g., speed, acceleration, deceleration, lateral acceleration, G-force) is known. In operation 604, in order to determine whether anomaly criteria is satisfied, data representative of an observed driver action is compared to the anomaly criteria for that action. If the observed action does not satisfy the criteria but are within the limits for that criteria, no additional action is taken. If the observed action satisfies the anomaly criteria (e.g., is above or below the limits of the anomaly criteria), the observed driver action is designated as an aberrational driver event in operation 606. Operations 604 and 606 are repeated until either a second aberrational driver event is detected or a time window has elapsed.

Figure 7:
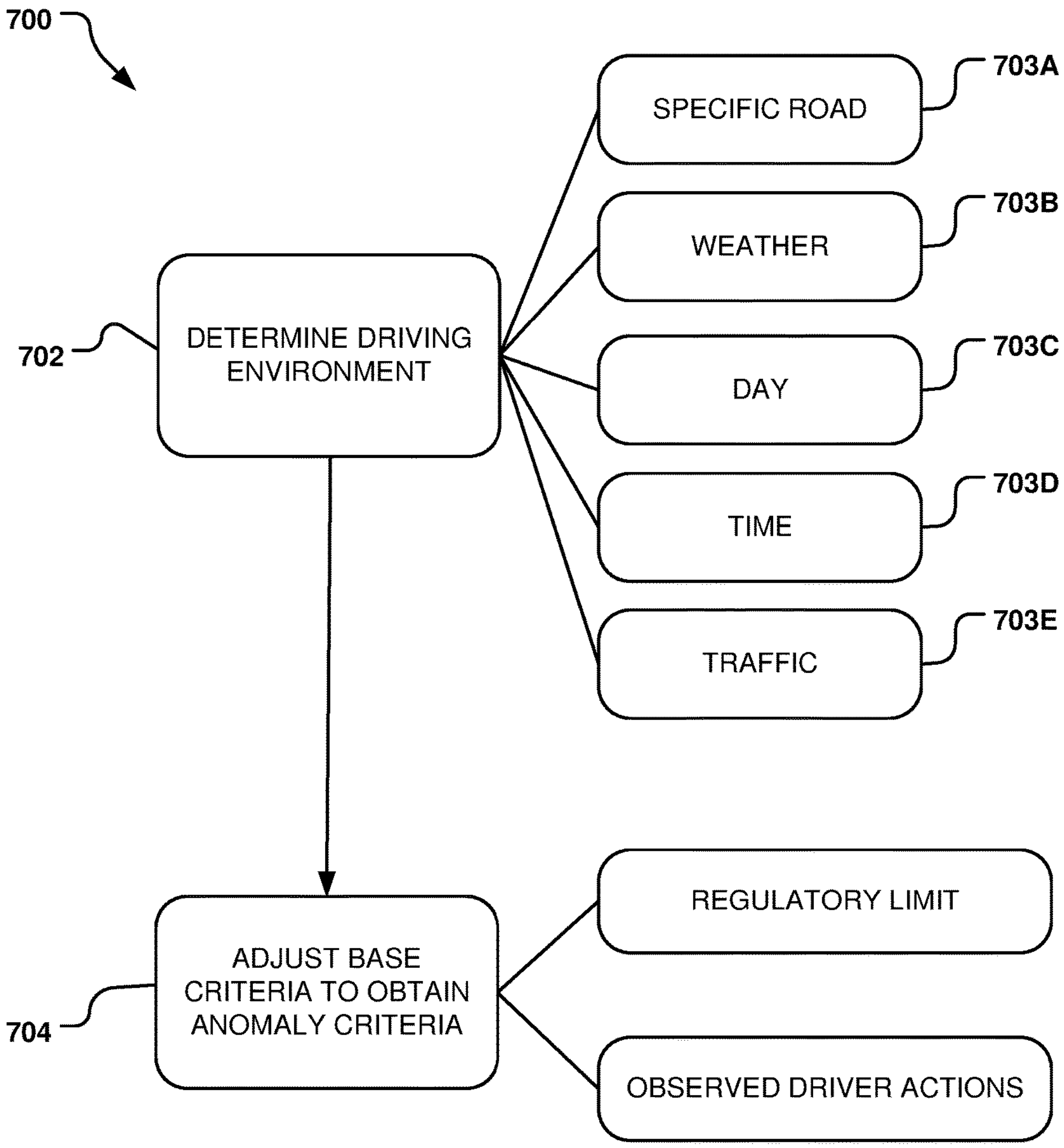
FIG. 7 is a step-wise flow chart of an example method for determining anomaly criteria for detecting an aberrational driver event.

FIG. 7 is a flow diagram of methodology 700 for setting anomaly criteria that may be used by driving monitoring and notification system to determine whether a particular driver action is aberrational. In operation 702, the current driving environment surrounding the vehicle is determined. Examples of environments 703 include the specific road or route 703A, weather conditions 703B, day of the week 703C, time of day 703D, traffic congestion 703E; these environments 703 can be used to set the anomaly criteria to determine aberrational driver events.

In operation 704, with the knowledge of the current driving environment, a base criteria is adjusted to obtain the anomaly criteria used to eventually determine aberrational driver events. The base criteria can be a regulatory limit (e.g., speed limit) or be based on previously observed driver behavior or driver actions.

Figure 8:
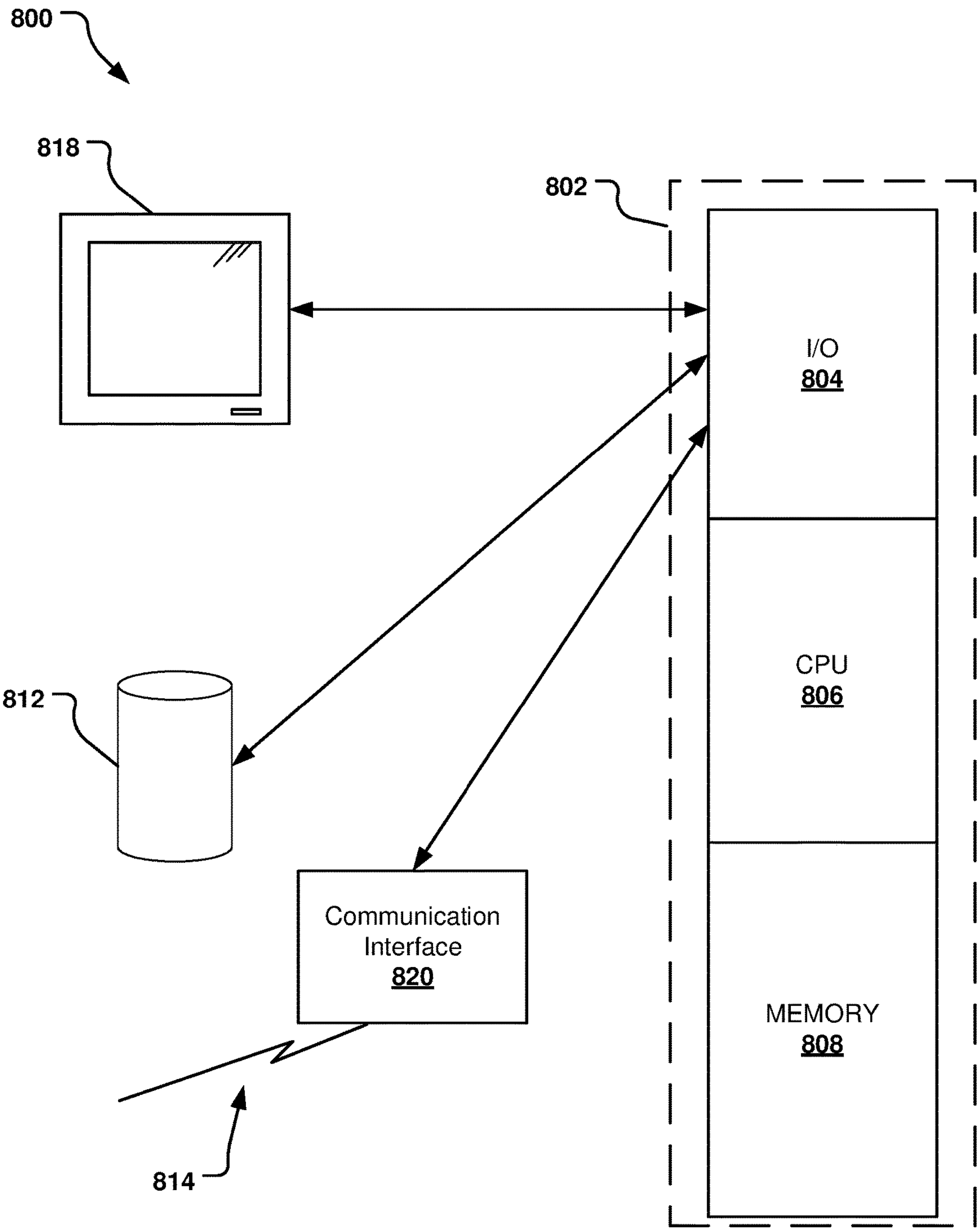
FIG. 8 is a block diagram of a computer system suitable for implementing one or more aspects of a system for monitoring driving.

FIG. 8 shows a computer system 800 suitable for implementing one or more aspects of a system for monitoring driving, such as the aberration detector module 120 of FIG. 1, the notification module 130 of FIG. 1, and the communication system 160 of FIG. 1. The computer system 800 is capable of executing a computer program product embodied in a tangible computer-readable storage medium to execute a computer process. As used herein, "tangible computer-readable storage media" includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium that can be used to store the desired information and that can accessed by a computer. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal.

Data and program files may be input to the computer system 800, which reads the files and executes the programs using one or more processors. Some of the elements of the computer system 800 are shown in FIG. 8; the system 800 has a processor 802 having an input/output (I/O) section 804, a Central Processing Unit (CPU) 806, and a memory section 808. There may be one or more processors 802 in the system 800, such that the processor 802 of the computing system 800 comprises a single CPU 806, or a plurality of CPUs 806. The processors 802, 806 may be single core or multi-core processors.

The computing system 800 may be a conventional computer, a distributed computer (including a distributed computer such as "the Cloud"), or any other type of computer. The described technology is optionally implemented in software (modules) loaded in memory 808, a storage unit 812, and/or communicated via a wired or wireless network link 814 on a carrier signal (e.g., Ethernet, 3G wireless, 6G wireless, LTE (Long Term Evolution)) thereby transforming the computing system 800 in FIG. 8 to a special purpose machine for implementing the described operations.

The I/O section 804 may be connected to one or more user-interface devices (e.g., a keyboard, a touch-screen display unit 818, etc.) or a storage unit 812. Computer program products containing mechanisms to effectuate the systems and methods in accordance with the described technology may reside in the memory section 808 or on the storage unit 812 of such a computer system 800.

A communication interface 820 is capable of connecting the computer system 800 to a network via the network link 814, through which the computer system can receive instructions and data embodied in a carrier wave. When used in local area networking (LAN) environment, the computing system 800 is connected (by wired connection or wirelessly) to a local network through the communication interface 820, which is one type of communications device. When used in a wide-area-networking (WAN) environment, the computing system 800 typically includes a modem, a network adapter, or any other type of communications device for establishing communications over the wide area network. In a networked environment, program modules depicted relative to the computing system 800 or portions thereof, may be stored in a remote memory storage device. It is appreciated that the network connections shown are examples of communications devices for and other means of establishing a communications link between the computers may be used.

In an example implementation, any or all of the modules from any discrepancy notification system, such as a volume calculating module and/or a notifying module, are embodied by instructions stored in memory 808 and/or the storage unit 812 and executed by the processor 802.

One or more databases storing data used in comparing different measurements may be stored in the disc storage unit 812 or other storage locations accessible by the computer system 800. In addition, the computer system 800 may utilize a variety of online analytical processing tools to mine and process data from the databases. Further, local computing systems, remote data sources and/or services, and other associated logic represent firmware, hardware, and/or software, which may be configured to characterize and compare different locales. A monitoring system of this disclosure can be implemented using a general purpose computer and specialized software (such as a server executing service software), a special purpose computing system and specialized software (such as a mobile device or network appliance executing service software), or other computing configurations. In addition, any or all of the module(s) may be stored in the memory 808 and/or the storage unit 812 and executed by the processor 802.

The implementations described herein are implemented as logical steps in one or more computer systems. The logical operations of the present invention are implemented (1) as a sequence of processor-implemented steps executing in one or more computer systems and (2) as interconnected machines or circuit modules within one or more computer systems. The implementation is a matter of choice, dependent on the performance requirements of the computer system implementing the invention. Accordingly, the logical operations making up the implementations described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification provides a complete description of the structure and use of exemplary implementations of the invention. The above description provides specific implementations. Features and/or elements may be interchanged among the various implementations. It is to be understood that other implementations are contemplated and may be made without departing from the scope or spirit of the present disclosure. The above detailed description, therefore, is not to be taken in a limiting sense. While the present disclosure is not so limited, an appreciation of various aspects of the disclosure will be gained through a discussion of the examples provided.

Unless otherwise indicated, all numbers expressing feature sizes, amounts, and physical properties are to be understood as being modified by the term "about." Accordingly, unless indicated to the contrary, any numerical parameters set forth are approximations that can vary depending upon the desired properties sought to be obtained by those skilled in the art utilizing the teachings disclosed herein.

As used herein, the singular forms "a", "an", and "the" encompass implementations having plural referents, unless the content clearly dictates otherwise. As used in this specification and the appended claims, the term "or" is generally employed in its sense including "and/or" unless the content clearly dictates otherwise.

Spatially related terms, including but not limited to, "bottom," "lower", "top", "upper", "beneath", "below", "above", "on top", "on," etc., if used herein, are utilized for ease of description to describe spatial relationships of an element(s) to another. Such spatially related terms encompass different orientations of the device in addition to the particular orientations depicted in the figures and described herein. For example, if a structure depicted in the figures is turned over or flipped over, portions previously described as below or beneath other elements would then be above or over those other elements.

Since many implementations of the invention can be made without departing from the spirit and scope of the invention, the invention resides in the claims hereinafter appended. Furthermore, structural features of the different implementations may be combined in yet another implementation without departing from the recited claims.

What is claimed is:

1. A method comprising:

receiving sensor data from a plurality of sensors within a vehicle driven by an individual driver;

analyzing the sensor data to detect at least two aberrational driver events from observed driver actions for the individual driver within a time window, the aberrational driver events time-separated and occurring when the observed driver actions for the individual driver satisfy anomaly criteria personalized for the individual driver based on the individual driver's history; and responsive to the detection of the at least two aberrational driver events, generating a notification to alert the individual driver of the vehicle.

2. The method of claim 1, further comprising:

dynamically adjusting at least one of the time window and a sampling frequency for the sensor data within the time window based on current conditions.

3. The method of claim 1, wherein the anomaly criteria are based on a driving behavior pattern of the individual driver.

4. The method of claim 1, wherein the anomaly criteria are based on a regulatory limit.

5. The method of claim 1, wherein the observed driver actions include at least one driving activity selected from rapid acceleration, speeding, deceleration or hard braking, erratic braking, and swerving or lateral acceleration.

6. The method of claim 5, wherein the at least two aberrational driver events are from the same driving activity.

7. The method of claim 5, wherein the at least two aberrational driver events are from different driving activities.

8. The method of claim 5, wherein the observed driver actions include at least two driving activities, and the aberrational driver events are based on less than the at least two driving activities.

9. The method of claim 1, wherein the anomaly criteria is based at least partially on current driving environment.

10. The method of claim 9, wherein the current driving environment includes any of road conditions, road congestion, weather, day of week, and time of day.

11. The method of claim 1, wherein the notification is selected based on the detected aberrational driver events.

12. The method of claim 1, wherein the notification is an audible notification.

13. The method of claim 12, wherein the audible notification is a verbal message.

14. The method of claim 12, wherein the audible notification requests a verbal response from the driver.

15. A system for monitoring and notifying a driver, the system comprising:

a discrepancy calculation module stored in memory and executable by a processor, the discrepancy calculation module configured to:

receive sensor data for an individual driver; and analyze the sensor data to detect at least two aberrational driver events from the data within a time window, the aberrational driver events time-separated and occurring when the data satisfy anomaly criteria personalized for the individual driver and adjusted based on the individual driver's history; and a notification module stored in memory and executable by the processor, the notification module configured to notify the individual driver upon detection of the at least two aberrational driver events.

16. The system of claim 15, with the notification module further configured to notify a remote location upon detection of the at least two aberrational driver events.

17. One or more non-transitory computer-readable storage media of a tangible article of manufacture encoding computer-executable instructions for executing on a computer system a computer process, the computer process comprising:

receiving sensor data for an individual driver;

analyzing the sensor data to detect at least two aberrational driver events from the data within a time window, the aberrational driver events time-separated and occurring when the data satisfy anomaly criteria personalized for the individual driver and adjusted based on the individual driver's history; and notifying the individual driver upon detection of the at least two aberrational driver events.

18. The method of claim 1, further comprising dynamically modifying the anomaly criteria for a subsequent time window.

19. The method of claim 18 wherein dynamically modifying the anomaly criteria comprises dynamically modifying the anomaly criteria based on the observed driver actions.

20. The system of claim 15 wherein the discrepancy calculation module is further configured to dynamically modify the anomaly criteria for a subsequent time window based on the individual driver's history.

* * * * *